United States Patent [19]

Keisling et al.

[11] Patent Number: 5,564,806
[45] Date of Patent: Oct. 15, 1996

[54] LOCKER

[75] Inventors: Alan P. Keisling, Clark's Summit, Pa.; Scott R. Gardner, Dublin, Ohio; Jeffrey J. Palfrey, East Stroudsburg; Jay T. Wood, Clark's Summit, both of Pa.

[73] Assignee: Compression Polymers Group, Moosic, Pa.

[21] Appl. No.: 196,660

[22] Filed: Feb. 10, 1994

[51] Int. Cl.⁶ .................. A47B 87/02; E04B 1/343
[52] U.S. Cl. .................. 312/263; 312/108; 312/140; 312/109; 403/382; 403/403; 403/231; 52/281; 52/264
[58] Field of Search ................ 312/257.1, 263, 312/265.5, 329, 309.1, 214, 100, 102, 111, 203, 140; 52/281, 282, 282.2, 264; 403/231, 382, 403, 120 S

[56] References Cited

U.S. PATENT DOCUMENTS

| | | |
|---|---|---|
| 2,651,559 | 9/1953 | O'Connor ......................... 312/329 |
| 2,837,393 | 6/1958 | Sitler ............................. 312/265.5 |
| 2,869,953 | 1/1959 | Miller et al. .................. 312/265.5 X |
| 3,360,321 | 2/1966 | Novales ........................ 312/263 X |
| 3,436,881 | 4/1969 | Schlecht ........................ 52/282.1 X |
| 3,602,567 | 8/1971 | Schnell et al. ................. 312/257 |
| 3,778,175 | 12/1973 | Zimmer ......................... 287/54 C |
| 3,779,177 | 12/1973 | Gigante ......................... 312/108 X |
| 3,819,246 | 6/1974 | List ............................. 312/257 SK |
| 3,854,269 | 12/1974 | Hancock ....................... 52/282.1 X |
| 3,967,425 | 7/1976 | Wolverton et al. ............. 52/237 |
| 4,055,924 | 11/1977 | Beaver, Jr. .................. 312/265.5 X |
| 4,289,363 | 9/1981 | Andersson et al. ............. 312/257 R |
| 4,441,766 | 4/1984 | Hess ............................ 312/214 |
| 4,447,099 | 5/1984 | French et al. ................ 312/257 R |
| 4,468,067 | 8/1984 | Jenkins ......................... 312/263 X |
| 4,579,400 | 4/1986 | French ......................... 312/257 SM |
| 4,753,495 | 6/1988 | Swink ........................ 312/265.5 X |
| 5,310,254 | 5/1994 | Dallaire ........................ 312/213 |
| 5,363,616 | 11/1994 | Hernandez ..................... 52/281 |
| 5,368,380 | 11/1994 | Mottmiller et al. ............ 312/263 |
| 5,372,415 | 12/1994 | Tisbo et al. .................. 312/263 X |

FOREIGN PATENT DOCUMENTS 412032  6/1934  United Kingdom ............ 312/263

OTHER PUBLICATIONS

"The Solid Plastic Locker Solution", Advertisement—Lenox Locker Company, 1992.

Primary Examiner—Peter M. Cuomo
Assistant Examiner—Robert J. Sandy
Attorney, Agent, or Firm—Standley & Gilcrest

[57] ABSTRACT

A locker is disclosed which comprises plastic panels and connectors on the edges of the panels for a snap together assembly that can be knocked down for shipment. A swing open front door plastic panel is also provided which preferably has a plastic hinge and plastic latch mechanism.

10 Claims, 6 Drawing Sheets

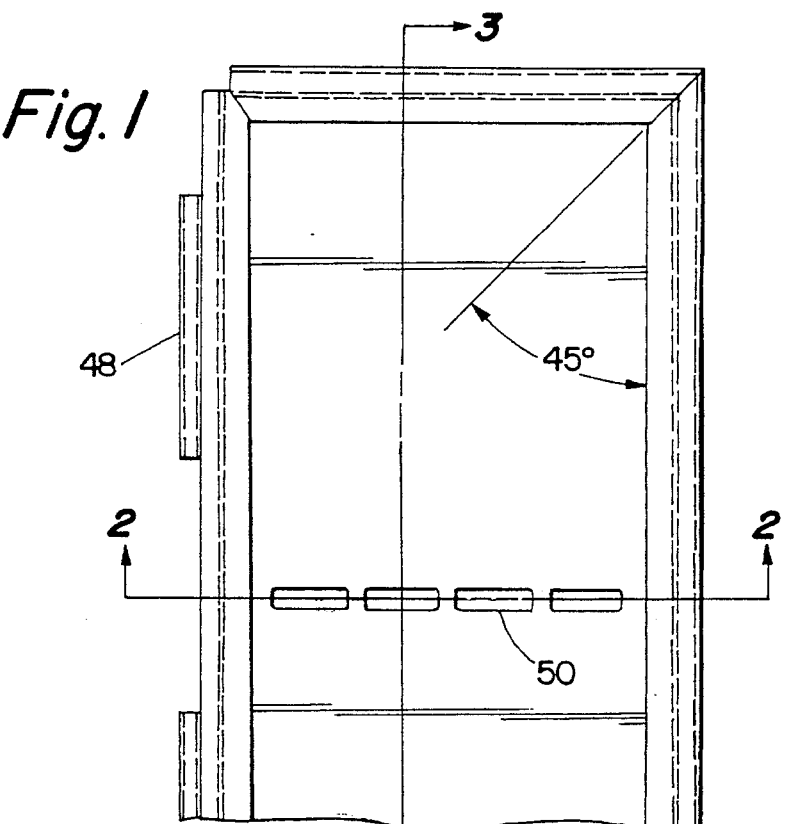
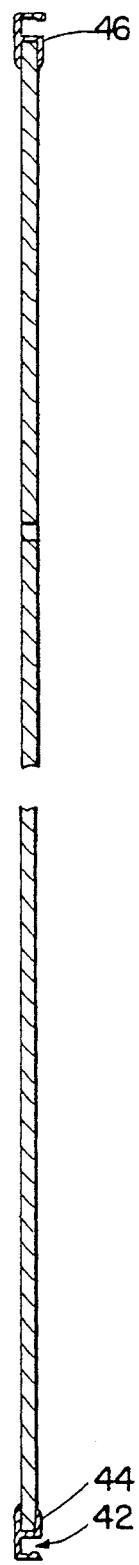
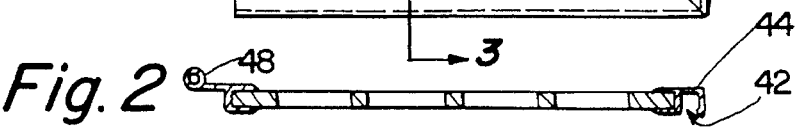

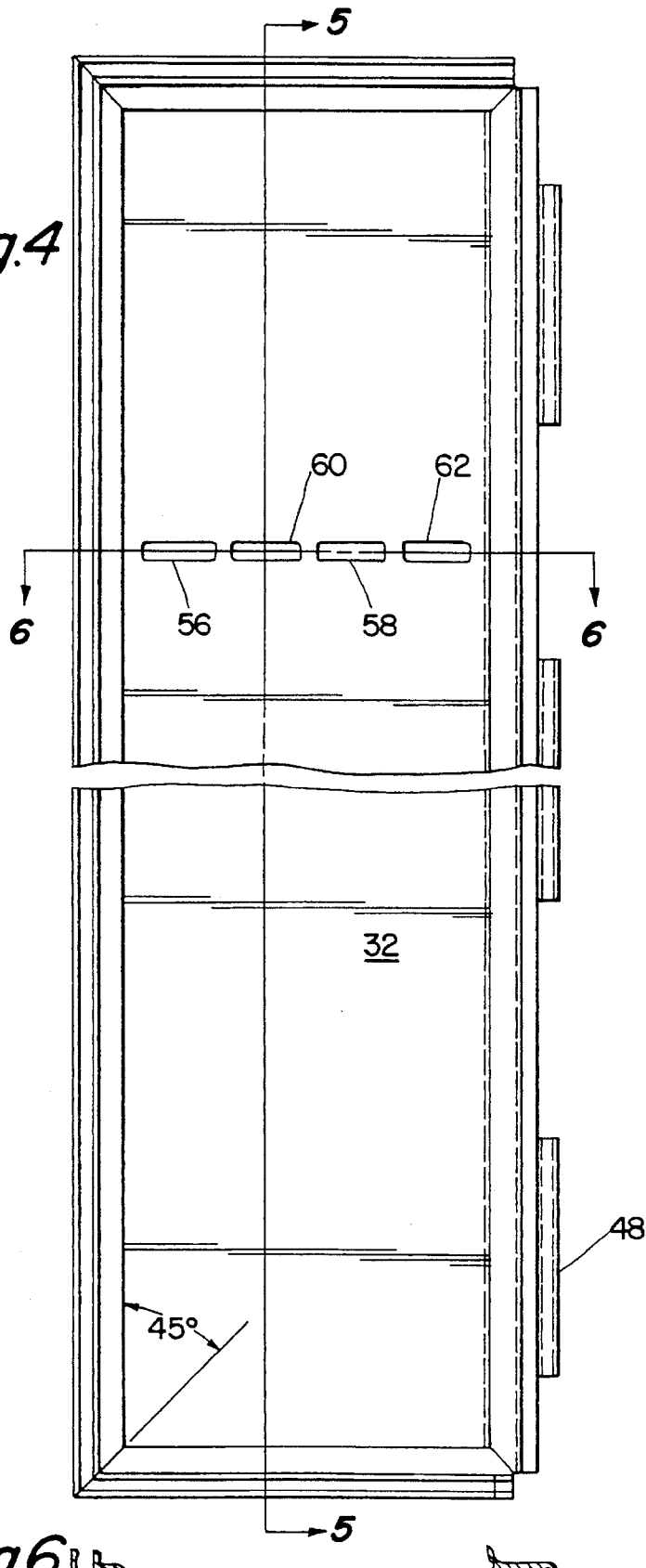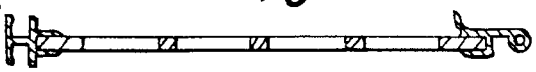

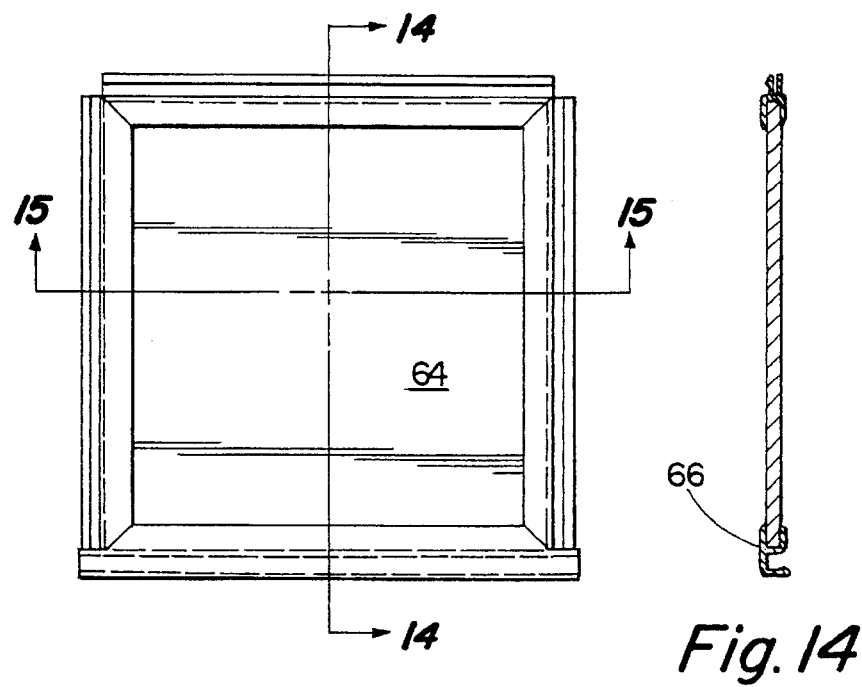
Fig. 13
Fig. 14
Fig. 15
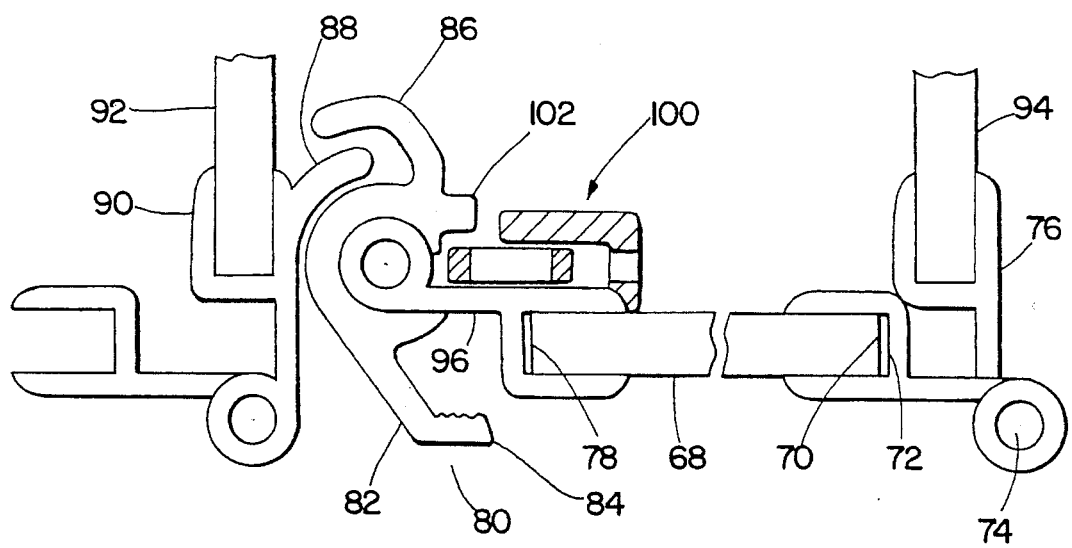
Fig. 16

LOCKER

BACKGROUND AND SUMMARY OF THE INVENTION

The present invention relates generally to storage lockers, and more particularly, to lockers having unique material composition and assembly features.

Storage lockers, which are also sometimes referred to as gym lockers or simply "lockers", are commonly found in many different settings. For example, athletic facilities have lockers to allow athletes to store their possessions while participating in athletic events. Community swimming pools typically have lockers for storing street clothes while a person swims. Lockers are also found in industry where they are used for several purposes, such as the storage of equipment, work clothes, chemicals, and other items which are preferably kept in such a concealed environment when not in use. Lockers are also commonly found in airports, hospitals, school hallways, prisons, and many other sites too numerous to mention.

Historically, lockers have been made of sheet metal construction and metal fasteners with a front door that swings open. Although the term locker is commonly used not all lockers actually lock shut, although locking devices are routinely found on doors of lockers.

Existing lockers suffer from several disadvantages. Due to metal construction, known lockers are frequently relatively heavy. Known lockers frequently require many hours of labor to assemble. Known lockers are easily damaged or marred in some way such as by dents, scratches, rust, odors, graffiti, delaminated and fading.

A need exists for a locker that is designed to overcome the aforementioned disadvantages of known lockers. The present invention is a primarily plastic locker construction. The sides, top, bottom, rear, and front panels of the locker of the present invention may all be made of a plastic material. In one preferred embodiment of the present invention the entire locker, including the hinges, fasteners, and joints are entirely plastic. In other embodiments of the present invention the panels are of a plastic material while the joints and hinges may be of non-plastic material. Several beneficial features of the locker of the present invention may be achieved that were not previously available in other locker constructions. While the present invention provides several unique advantages, it may also incorporate several of the previously known locker features such as shelves, a front door that swings open, and locks on the door if preferred.

The locker of the present invention may be assembled without tools and may be knocked-down for shipment into a plurality of generally flat panel sections. Thus, shipping the locker will not include shipping of vast amounts of cubic feet of air which is the case with lockers that do not comprise a knock-down construction. Further, the locker of the present invention is relatively easy to repair. If a panel is in need of replacement it is simply removed and a new panel maybe snapped into place.

Due to the primarily plastic construction, the locker of the present invention will not rust at all if the entire locker is plastic and will be extremely rust resistant even if some metal fasteners are used. The locker of the present invention will not dent in its main body panels as will known metal lockers. The locker of the present invention will maintain its color throughout the entire cross-section of each panel. In a preferred embodiment the panels are not painted but are colorfast from the factory. Due to the homogenious nature of the plastic panels the lockers of the present invention will not delaminate. Furthermore, most materials used in the application of graffiti are readily removed from plastic panels to return the panels to their original surface appearance.

The lockers of the present invention may be constructed with several different densities of plastic material to provide the capability of varying the weight of the overall locker in accordance with the purchaser's particular use for the lockers. For example, the military may desire lockers on ships to be as lightweight as possible. By varying the density of each panel the overall locker weight may be reduced.

Other features and advantages of the present invention will be apparent from the following description and claims and are illustrated in the accompanying drawings which show preferred features of the present invention and the principles thereof.

BRIEF DESCRIPTION OF THE DRAWINGS

FIG. 1 is an elevation view of a right end panel of a preferred embodiment of the locker of the present invention;

FIG. 2 is a view taken along lines 2—2 of FIG. 1;

FIG. 3 is a view taken along lines 3—3 of FIG. 1;

FIG. 4 is an elevation view of a center panel of a preferred embodiment of the locker of the present invention;

FIG. 5 is a view taken along lines 5—5 of FIG. 4;

FIG. 6 is a view taken along lines 6—6 of FIG. 4;

FIG. 13 is a plan view of a panel for the top and bottom of a preferred embodiment of the locker of the present invention;

FIG. 14 is a view taken along lines 14—14 of FIG. 13;

FIG. 15 is a view taken along lines 15—15 of FIG. 13;

FIG. 16 is a sectional view looking down on a front door of a preferred embodiment of the locker of the present invention, including the hinge assemblies, latch assembly, and handle;

DETAILED DESCRIPTION OF PREFERRED EMBODIMENT

Figure 7:
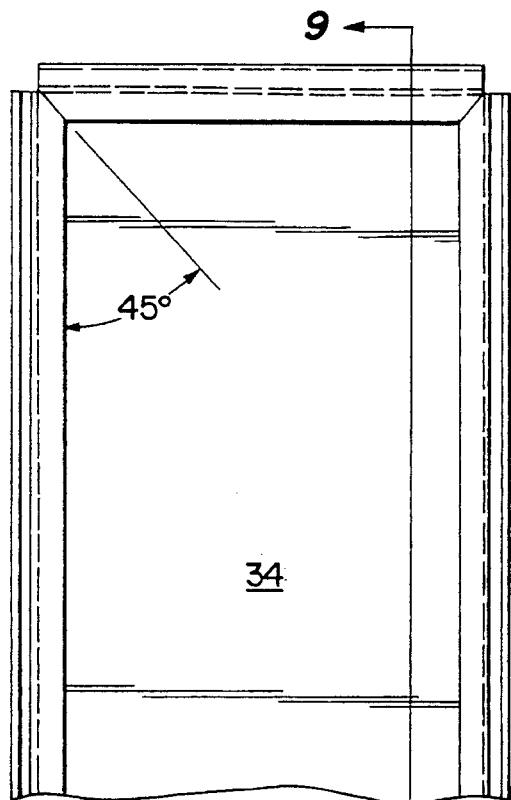
FIG. 7 is an elevation view of a back panel of a preferred embodiment of the locker of the present invention.

Referring now to the drawings, FIGS. 1, 4, 7, and 10 show the vertical right end panel 30, common center panel 32, back panel 34, and left end panel 36 respectively. In a two locker, side-by-side set the center panel 32 as shown in FIG. 4 would be common (i.e. shared) by both lockers in the set. Each locker would have a back panel 34 as shown in FIG. 7.

Figure 8:
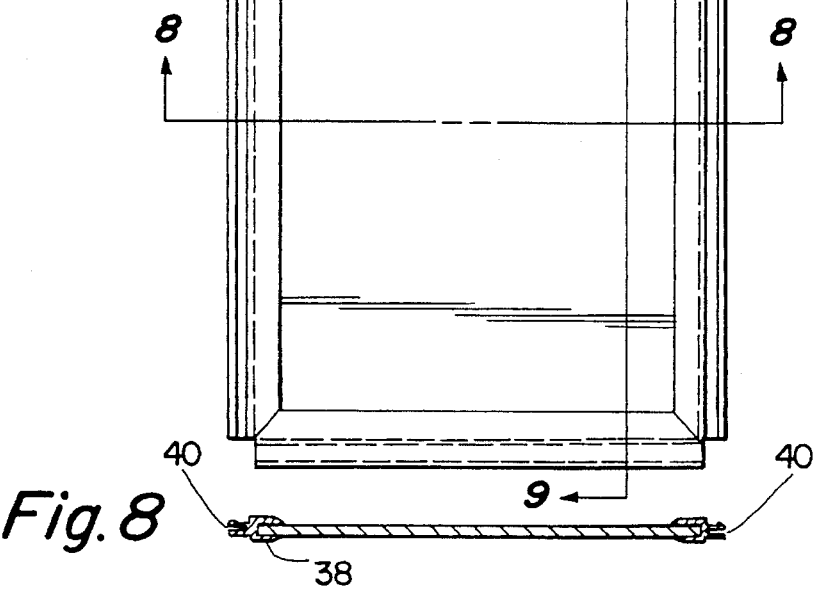
FIG. 8 is a view taken along lines 8—8 of FIG. 7.
Figure 9:
FIG. 9 is a view taken along lines 9—9 of FIG. 7.

FIGS. 2, 3, 5, 6, 8, 9, 11, and 12 reveal different views of each of the panels with associated connectors at each edge thereof for interconnecting with the edge connectors of adjacent panels to form an assembled locker enclosure. Certain ones of the connectors 38, such as shown in FIG. 8, have protrusions 40 therefrom which are designed to reside within voids 42 in others of the connectors 44 such as those shown in FIG. 2. The protrusions 40 are designed to be slightly larger than the opening 46 to the void 42 of the mating connectors 44 so that a relatively secure and stable, snap-in connection is accomplished when the protrusions 40 of the male connectors 38 are pressed within the voids 42 of the mating connectors 44.

Figure 10:
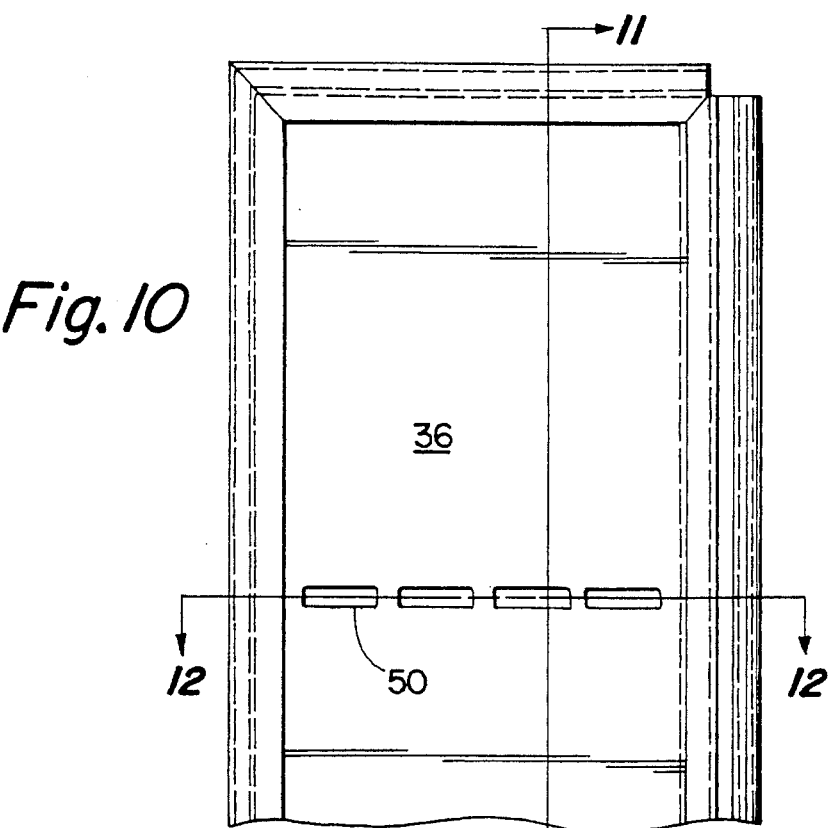
FIG. 10 is an elevation view of a left end panel of a preferred embodiment of the locker of the present invention.
Figure 11:
FIG. 11 is a view taken along lines 11—11 of FIG. 10.
Figure 12:
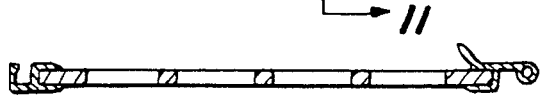
FIG. 12 is a view taken along lines 12—12 of FIG. 10.
Figure 19:
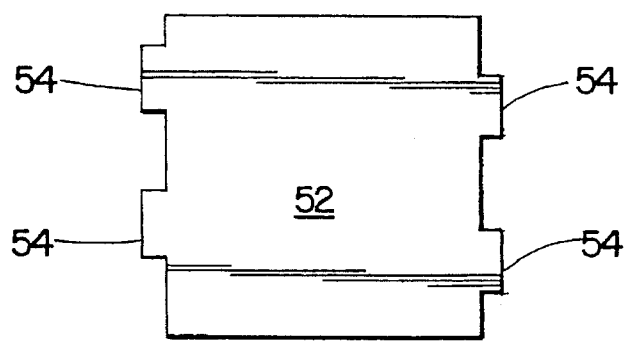
FIG. 19 is a plan view of a shelf for use in the locker of the present invention.

Hinges 48 may be added to some of the panels as shown in FIGS. 1, and 4 to allow for the mounting of a door capable of swinging open and swinging closed. Slots 50 may be formed in the side panels (left end, common center panel, right end panel) as shown in FIGS. 1, 4, and 10. These slots 50 may be positioned in practically any horizontal plane within the vertical height of the locker assembly to accommodate; a shelf that may be snapped into place within the slots 50. As shown in FIG. 19 the shelf 52 may be a relatively simple flat piece of material with tabs 54 protruding therefrom for insertion into the slots 50. Shelves in adjacent lockers would have alternating tabs to reside in two 56, 58 of the four slots of a common panel 32 thereby keeping the other two slots 60, 62 available for accommodating the tabs of a shelf located in an adjoining locker. A plurality of shelves may be secured in such a way within a single locker. Alternatively, one vertical span may be divided into several small lockers in much the same way.

FIGS. 13, 14, and 15 show a typical top or bottom panel 64 for a locker of the present invention. The connectors 66 shown in these Figures function in the same way as the connectors described above to secure the top and bottom panels to the rear and side panels of each locker.

The top, bottom, side, rear, and front panels of each locker of the present invention are preferably made of a polyolefin material, such as high density polyethelyne (HDPE). The connectors, including the hinges, protrusions and mating connectors may all be made of a material such as polyvinyl chloride. However, the connectors may also be comprised of other materials which may work equally well, such as aluminum. Each of the connectors may be secured to the panels in various ways such as by use of plastic rivets, by adhesives, or by traditional metal fasteners. If shelves are placed within the locker, the shelf may also be of an HDPE material.

Referring now to FIG. 16, the front door 68 or panel of the present invention is shown in a cross section view. The door 68 is secured at one of its longitudinal edges 70 to a hinged connector 72 that revolves around a rod 74 which joins the door hinge connector with a side panel connector 76. The rod 74 may be metal or it may be of a non-metal material such as nylon. On the second longitudinal edge 78 of the door, which opens to allow access to the interior of the locker, a handle latch assembly 80 may be provided to assist in latching the door shut and opening the door 68 once latched. The handle portion 82 of the latch assembly 80 may be continuous along the entire vertical span of the door 68. The handle may have a protrusion 84 which may allow access for a person's hand to grasp the handle and rotate it clockwise to disengage a hook end 86 of the handle 82 which resides within the closed locker from a finger 88 extending off of one of the connectors 90 on a second side panel 92. Once the hook end 86 has released form the finger 88 the handle 82 may be pulled resulting in the door 68 swinging open on the hinge 72 associated with the first side panel 94. The handle 82 may be mounted so that it rotates around another connector 96 secured to the opening side longitudinal edge 78 of the front door 68 panel. A lock mechanism 100 may be added to the front door panel such that when the lock is set, the handle will be prevented from rotating so that the hook end of the handle will not be able to be disengaged from the finger. A stop 102 on the handle may be positioned to contact the lock when the handle is being rotated to stop further rotation of the handle when the lock is in position.

Figure 17:
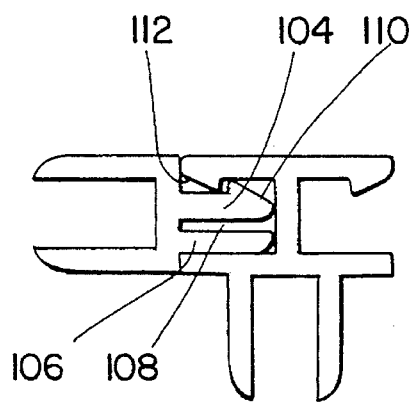
FIG. 17 shows a typical sectional view of a male joint interlocking with a profile of a panel of a preferred embodiment of the locker of the present invention.
Figure 18:
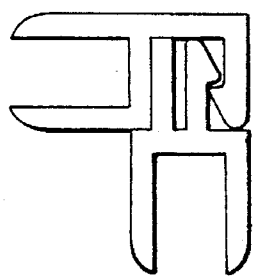
FIG. 18 is a typical sectional view of a corner joint of a preferred embodiment of the locker of the present invention.

FIGS. 17 and 18 show the projections from male connectors engaged within the voids of mating connectors. Each male connector may comprise two prongs 104, 106 with a space 108 there between and a leading angled edge 110 on one of the prongs 104 which contacts a leading angled edge 112 on the mating connector as the protrusion enters the mating connector causing the gap between the two prongs to close sufficiently to allow the protrusion to advance into the void, past the leading edge of the mating connector. Once inside the void the protrusion would assume its normal position, effectively interlocked within the void of the mating connector. FIG. 18 shows the same principle applied to corner connectors.

With the design of the present invention the hinge to the door panel may be continuous and integral with the door panel and side wall. The door panel if on a single locker, may have a 270° angle of swing as opposed to the limited 180° angle of swing common in known lockers. The latch assembly of the locker of the present invention may be an entirely plastic latch that runs generally along the entire length of the opening edge of the front door panel of the locker. The latch assembly can be seen in FIG. 16.

Due to the snap together nature of the connectors of the present invention, the locker may be assembled without tools. The connectors themselves may be secured to the panels at the factory leaving the only remaining assembly step to be the joining together of the connectors. The connectors may be secured to the panels in a number of ways known to those of ordinary skill in the art, such as by plastic fasteners, metal fasteners, adhesives, weldments, and the like. The locker of the present invention may be sterilized using various known processes for use in sanitary environments.

The present invention is not limited to the embodiments shown and may lend itself to be modified by one of ordinary skill in the art and any such modifications are intended to fall within the spirit and scope of the following claims.

What is claimed is:

1. A locker, comprising:

a right side homogeneous plastic panel having a first half of a first connector pair attached directly to the rear longitudinal edge of said right side panel;

a left side homogeneous plastic panel having a first half of a second connector pair attached directly to the rear longitudinal edge of said left side panel;

a rear plastic panel having a second half of said first connector pair attached directly to a first longitudinal edge of said rear panel and a second half of said second connector pair attached directly to a second longitudinal edge of said rear panel;

a bottom homogeneous plastic panel adapted to be joined to each of said right side panel, said rear panel, and said left side panel;

a top homogeneous plastic panel adapted to be joined with said left side panel, said rear panel, and said right side panel;

said first and second halves of said first and second connector pairs selected from the group consisting of male connectors and mating connectors, such that when said first half of said first or second connector pair is a male connector, said second half of said first or second connector pair is a mating connector, and when said first half of said first or second connector pair is a mating connector, said second half of said first or second connector pair is a male connector, enabling said right and left side panels to be secured to said rear panel by securing said first and second halves of said first connector pair to each other and said first and second halves of said second connector pair to each other, such that said right side panel and said rear panel, and said left side panel and said rear panel are in a fixed relationship to each other;

a front door plastic panel attached with a hinge to a forward longitudinal edge of one of said side panels; and a latch secured to the forward longitudinal edge of the other side panel opposite said side panel having said hinge, such that as said door swings on said hinge to a closed position, the door will be held in the closed position by said latch.

2. The locker of claim 1, further comprising: a lock mechanism installed in said door panel.

3. The locker of claim 1, wherein said latch extends generally along the entire longitudinal length of the forward edge of said left side panel.

4. The locker of claim 1, further comprising: a handle secured to the opening edge of said door panel.

5. The locker of claim 4, wherein said handle extends generally along the entire longitudinal length of the opening of said door panel.

6. The locker of claim 1, further comprising: a shelf which snaps into place in a horizontal plane within said locker, in slots prepared in said left side panel and said right side panel.

7. The locker of claim 1, wherein said connectors are plastic.

8. The locker of claim 1, wherein said connectors are metal.

9. The locker of claim 1, wherein said hinge is integral with said side panel.

10. A locker, comprising:

a first side panel of plastic material, said first side panel having a hinge attached directly to a leading longitudinal edge thereof, and a mating connector attached directly to a back longitudinal edge thereof;

a second side panel made of plastic material, said second panel having a latch receiver attached directly to its leading longitudinal edge and a mating connector attached directly to its rear longitudinal edge;

a rear panel of plastic material having male connectors attached directly to each of its first and second longitudinal edges, wherein said male connectors are each attached to one of said mating connectors attached to said first and second side panels;

a top panel secured to the top edges of said first side panel, said rear panel and said second side panel;

a bottom panel secured to a bottom edge of said first side panel, said rear panel, and said second side panel;

a door panel having a mating hinge attached directly to one edge of said door and a latch attached directly to an opposite edge of said door, such that said mating hinge is brought into working association with said hinge attached to said first side panel, and said latch on said door is brought into working relationship with said latch receiver attached to said second side panel when said door is closed.

* * * * *

UNITED STATES PATENT AND TRADEMARK OFFICE
CERTIFICATE OF CORRECTION

PATENT NO. : 5,564,806
DATED : October 15, 1996
INVENTOR(S) : Keisling, et al

It is certified that error appears in the above-indentified patent and that said Letters Patent is hereby corrected as shown below:

On the title page, item [75] Inventor's name. "Jeffrey J. Palfrey" should read -- Jeffrey J. Palfey --.

Signed and Sealed this

First Day of April, 1997

BRUCE LEHMAN

Attest:

Attesting Officer

Commissioner of Patents and Trademarks